Jan. 9, 1962 H. MORAFF 3,016,468
TRANSISTOR MONOSTABLE CIRCUIT
Filed June 11, 1958

INVENTOR
H. MORAFF
BY Harold C. Herman
ATTORNEY 3,016,468

TRANSISTOR MONOSTABLE CIRCUIT

Howard Moraff, Bronx, N.Y., assignor to Bell Telephone Laboratories, Incorporated, New York, N.Y., a corporation of New York Filed June 11, 1958, Ser. No. 741,294
12 Claims. (Cl. 307—88.5)

This invention relates generally to trigger circuits and more particularly to monostable trigger circuits having a fast recovery time.

A monostable circuit is defined as one which has a single stable operating point and which is capable of resetting itself after having been transferred therefrom by an external agent. There are two features common to monostable circuits wherein a single current multiplication transistor device is employed as the active element. The first of these features is that the transistor device has an alpha or current amplification factor which is greater than unity. Alpha is defined as the ratio of the change in collector current to a given change in emitter current when the collector voltage is held constant. The second of these features is that a base impedance large enough to support regeneration is employed in the circuit arrangement. The combination of a transistor device having an alpha greater than unity and a large base impedance is productive of an input characteristic for the transistor device having a negative resistance region. This negative resistance region results from regeneration or positive feedback due to the inherent coupling from the collector electrode back to the emitter electrode and the result of the alpha across the base impedance. A negative resistance characteristic is obtained when the product of the alpha of the transistor device and the external base impedance is greater than the sum of the external emitter impedance and the external base impedance.

Point contact transistors of the type disclosed in United States Patent 2,524,035 issued to J. Bardeen and W. H. Brattain on December 3, 1950, inherently possess an alpha which is greater than unity and are readily employed singly in monostable circuits. Junction transistors, however, inherently have an amplification factor less than unity making them unsuitable for single transistor monostable circuits. Two junction transistors of opposite conductivity types may be corelated to form an equivalent current multiplication device having an effective alpha greater than unity. The corelation of two junction transistors of opposite conductivity types to produce a three-terminal current multiplication device is shown, for example, in United States Patent 2,665,609 issued to W. Shockley on October 13, 1953, and the copending patent application Serial No. 654,603 filed by B. W. Lee on April 23, 1957. Two junction transistors so corelated are adaptable for use in monostable circuits.

For monostable operation, a circuit may be provided with a normally stable or low conduction state of operation from which it may be transferred to an unstable or saturated state of operation by a properly applied triggering pulse. The transitions from a stable state to an unstable state of operation and the return therefrom are rapid due to the negative resistance characteristics of the monostable circuit. This rapidity of transfer from one state of operation to the other is productive of a fast rise time and decay time for the output pulse. A current limiting capacitor is very often employed to control the duration of the unstable state of operation. Such capacitor may be arranged in the circuit to either displace the emitter load line with respect to the characteristic curve of the monostable circuit or to affect the characteristic curve with respect to the emitter load line.

In the former arrangement, the current limiting capacitor acts to vary the emitter current flow with time to effectively reverse bias the emitter-base circuit of the transistor device. In the latter arrangement, the current limiting capacitor acts to decrease the effective alpha of the current multiplication device with time to control the positive feedback or regeneration in the monostable circuit. In each of the above-described arrangements, the circuit will reset itself to a stable state of operation when the emitter load line does not intersect the high positive resistance region of the characteristic curve. The effect of the current limiting capacitor in each of these arrangements is to control the duration of the intersection of the emitter load line with the high current region of the characteristic curve. Such intersection is maintained for an interval determined by that time required for the capacitor to charge sufficiently to either reverse bias the transistor device of the monostable circuit or, in the second arrangement, to decrease the effective alpha of the current multiplication device to a value sufficient to prevent such intersection.

While current limiting capacitors are effective to control the duration of the output pulses in each of the above-mentioned arrangements, they inherently place certain limitations upon the operation of such arrangements. These limitations arise due to the capacitor having accumulated a charge during the unstable state of operation which remains thereon after the circuit has reset. Such accumulation must be eliminated before the monostable circuit can return to its equilibrium point of operation. However, the current limiting capacitor requires an appreciable time interval within which to discharge. During this time interval, the sensitivity of some types of monostable circuit arrangements is decreased and a triggering thereof requires a pulse of greater magnitude. In other types of monostable circuits, the duration of the output pulses is varied as the duration would be determined by that time which is required to charge the current limiting capacitor from the accumulated level of charge to that level which is required to reset the monostable circuit. In still other monostable circuit arrangements, the effect of the accumulated charge on the capacitor defines the minimum limit for the interpulse interval or an upper limit for the circuit repetition frequency. The operation of each type of monostable circuit, therefore, is dependent upon that time interval which is required to discharge the capacitor after the circuit has transferred from an unstable state of operation. As output pulse duration is determined by the current limiting capacitor, an interdependence is present between the duration of the output pulse and the interpulse interval. This interdependence presents the dilemma whereby the employment of a smaller capacitor to reduce the interpulse interval necessarily also reduces the duration of the available output pulses. Accordingly, it is difficult in monostable circuits as employed in the present state of the art to provide an output pulse of substantial duration having a very small interpulse interval while maintaining circuits sensitivity.

It is a principal object of this invention to provide an improved monostable transistor circuit.

Another object of this invention is to provide a monostable transistor circuit wherein the interpulse interval is independent of output pulse duration.

A further object of this invention is to provide a monostable circuit wherein the interpulse interval between output pulses is reduced.

A still further object of this invention is to provide a monostable trigger circuit wherein the control capacitor has a fast discharge rate.

The interdependence of output pulse duration and circuit operation of a monostable circuit is effectively eliminated in specific illustrative embodiments of my invention, wherein the monostable transistor circuit comprises a pair of opposite conductivity transistors in a hook connection with a timing capacitor connected to the emitter of one of the monostable circuit transistors, by the provision of a transistor discharge path for the timing or current limiting capacitor which is essentially distinct from the charging path for the capacitor and which is connected in the circuit in a particular manner. Specifically, the discharge path transistor is of opposite conductivity type to the transistor to the emitter of which the timing capacitor is connected and is arranged so that its emitter is connected to the emitter of the monostable circuit transistor, its base is connected to the base of the monostable circuit transistor, and the emitter-collector circuit of the discharge transistor is in shunt across the capacitor.

In one specific illustrative embodiment wherein the timing capacitor determines the emitter load line, the timing capacitor is connected to the emitter of the first monostable circuit transistor. In another specific illustrative embodiment wherein the timing capacitor varies the effective alpha of the monostable circuit, the capacitor is connected to the emitter of the second transistor of the monostable circuit.

In each embodiment, however, the discharge path transistor is connected so that its emitter-base circuit is across the emitter-base circuit of the adjacent monostable circuit transistor and so that its emitter-collector circuit by-passes both the high impedance of this emitter-base circuit of the monostable circuit transistor and the base impedance connected to the monostable circuit transistor for proper circuit operation. In each embodiment, for any material value of emitter current in the monostable device, the transistor presents a high impedance to current flow. However, upon the timing or current limiting capacitor having charged sufficiently to reset the monostable circuit to a stable state of operation, the discharge path transistor presents a low impedance rapidly to discharge the capacitor so as to minimize the interpulse interval.

It is a feature of this invention that the timing capacitor connected to the emitter of a first transistor in a monostable transistor circuit have a discharge path comprising a second transistor of opposite conductivity to the first transistor and having its emitter connected to the first transistor emitter, its base to the first transisor base, and its emitter-collector circuit in shunt across the timing capacitor.

It is another feature of this invention that the transistor in shunt across the timing capacitor and providing a low impedance discharge path therefor also be connected to by-pass both the back impedance of the emitter-base circuit of the first transistor and the base impedance connected to the base of the first transistor.

It is a further feature of one specific illustrative embodiment of this invention that a pair of transistors of opposite conductivity type be interconnected in a hook connection with a first resistor connected between the base of the second transistor of the pair and a common junction point and a second resistor connected between the emitter of the second transistor of the pair and the common junction point, a timing capacitor be connected in shunt with the second resistor, and a third transistor of opposite conductivity to the second transistor be connected so that its emitter-collector circuit is also in shunt across the second resistor and the timing capacitor.

A complete understanding of this invention and of the various desirable features thereof may be gained from consideration of the following detailed description and the accompanying drawing, in which.

Figure 1:
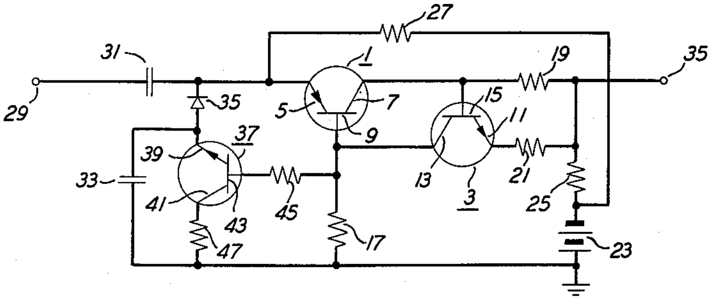
FIG. 1 is a diagrammatic representation of a monostable circuit of the type wherein the emitter load line is displaced with respect to the characteristic curve of the monostable circuit and embodying the principles of the present invention.
Figure 2:
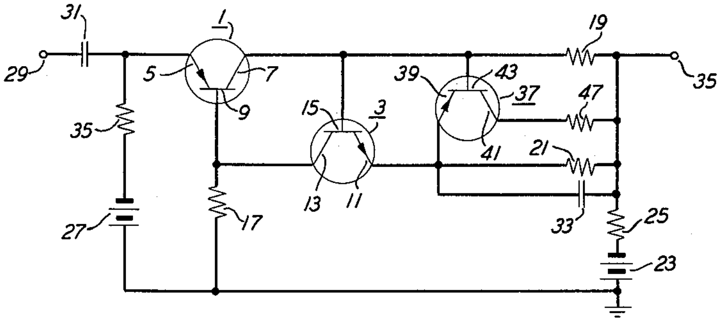
FIG. 2 is a diagrammatic representation of a monostable circuit of the type wherein the effective alpha of the equivalent current multiplication transistor device is varied with time to affect the characteristic curve with respect to the emitter load line and embodying the principles of the present invention.
Figure 3:
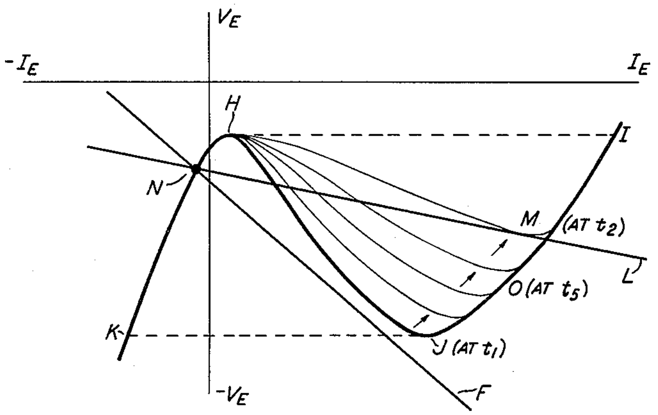
Figures 4A, 4B:
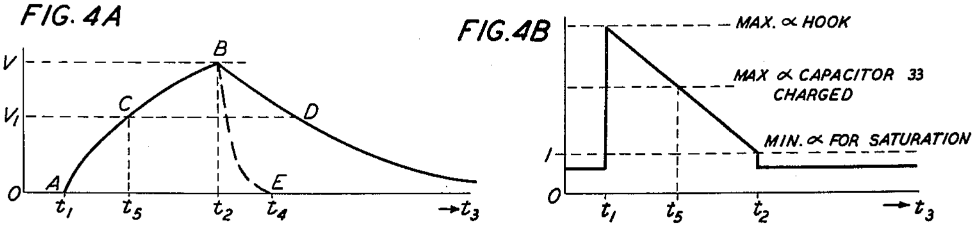

FIG. 3 is a curve illustrating the negative resistance input characteristics of the current amplification devices depicted in FIGS. 1 and 2; and FIG. 4A is a series of curves illustrating the voltage developed across the current limiting capacitor during the stable and the unstable states of operation of the monostable circuits of FIGS. 1 and 2 and FIG. 4B graphically depicts the resultant variation of the composite alpha of the circuit shown in FIG. 2 as a result of this voltage.

Referring now to the drawings, FIG. 1 shows a three-terminal equivalent current multiplication transistor device comprising junction transistors 1 and 3 which has been adapted for monostable operation. While the junction transistors 1 and 3 are shown as being of certain conductivity types, it is to be understood that opposite conductivity type transistors may be substituted for transistors 1 and 3 if the biasing potentials hereinafter to be described are similarly reversed. Each of the transistors 1 and 3 has associated therewith conventional electrodes. Transistor 1, which is shown as a p-n-p type transistor, has an emitter electrode 5, a collector electrode 7 and a base electrode 9. Transistor 3, which is shown as an n-p-n type transistor, has an emitter electrode 11, a collector electrode 13 and a base electrode 15. The collector electrode 7 is electrically integral with the base electrode 15. Similarly, the collector electrode 13 is electrically integral with the base electrode 9. The junction of the base electrode 9 and the collector electrode 13 is connected to ground through a resistor 17. This cross-coupling of the base and collector electrodes of transistors 1 and 3 provides for a composite arrangement or an equivalent transistor current multiplication device having a current amplification factor or alpha which is greater than unity. This result is due to a positive feedback current developed by the transistor 3 and effective upon the base circuit of transistor 1 as will be more fully described hereinafter. The emitter electrode 11 and the base electrode 15 of transistor 3 are connected to a common point through the resistors 19 and 21, respectively. It is evident that this common point is also connected to the collector electrode 7 of the transistor 1 through the resistor 19 since the collector electrode 7 and the base electrode 15 were described above as being electrically integral. A negative source of operational voltage 23 is connected to the junction of resistors 19 and 21 through the load resistor 25 across which an output pulse is developed at the output terminal 35. Voltage source 23 is also connected to the emitter electrode 5 of transistor 1 through the resistor 27. The negative potential supplied to the emitter electrode 5 from the voltage source 23 is effective to maintain the equivalent transistor device in a non-conductive or stable state as the base electrode 9 is essentially at ground potential. An input terminal 29 is also connected to the emitter electrode 5 through the coupling capacitor 31. Input terminal 29 receives positive triggering pulses which are effective to forward bias the emitter electrode 5 with respect to the base electrode 9.

In the above-described circuit, the state of operation of transistor 1 determines the state of operation of the composite arrangement and may be considered as the active element therein. Accordingly, the electrodes associated therewith, i.e., emitter electrode 5, collector electrode 7 and base electrode 9, are operative to control the operation of the composite arrangement. However, due to the cross-coupling arrangement of transistors 1 and 3, the junction of the base electrode 9 and the collector electrode 13 is effectively an equivalent base electrode, and the junction of resistors 19 and 21 is effectively an equivalent collector electrode of the composite arrangement. Therefore, by proper control of the transistor 1, the composite arrangement is also controlled. While the emitter-base junction of transistor 1, which corresponds to an equivalent emitter-base junction of the composite arrangement, is in a reverse biased condition, there is no current flow through load resistor 25.

The above-described arrangement of transistors 1 and 3 may be readily adapted for monostable operation. For monostable operation, a current limiting or control capacitor 33 is connected between ground and the emitter electrode 5 through a diode 35. The diode 35 is poled in a direction of the positive emitter current in transistor 1 and is effective to maintain a high input impedance for the composite arrangement during the application of a triggering pulse. Capacitor 33 is, therefore, arranged in the current path of emitter electrode 5. The use of such current limiting capacitors to provide monostable operation for transistors having an alpha greater than unity is well known in the art. Such, for example, is shown in Patent No. 2,629,833 issued to R. L. Trent on February 24, 1953.

Upon the application of a positive triggering pulse at input terminal 29, the reverse biasing effect of voltage source 23 is overcome and the emitter-base junction of transistor 1 becomes forward biased. Conduction in transistor 1 causes a base current to flow through the resistor 17. As transistor 1 was described as a junction transistor having an inherent amplification factor less than unity, base current alone from the base electrode 9 through the resistor 17 is not sufficient to support regeneration. The collector current from transistor 1 is, however, directed to the arrangement of resistor 19 in parallel with the emitter-base junction of transistor 3 which is serially arranged with the resistor 21. The amount of current in each path of the parallel arrangement is determined by the ratio of the impedance presented to the collector current flow from transistor 1 in one path with respect to that presented in the other. A selection of resistors such that resistor 21 is approximately ten times as large as resistor 19 has been found to give satisfactory performance. Such ratio of resistors 19 and 21 is also effective to eliminate the problem of cumulative leakage currents. A portion of the collector current of transistor 1 is, therefore, directed to the base electrode 15 which is sufficient to forward bias the emitter-base junction of transistor 3. The forward biasing of transistor 3 initiates a current flow from the collector 13. Conduction of both transistors 1 and 3 is productive of two distinct currents, a base current and a collector current, respectively, which flow from ground through the base resistor 17 in the same direction. This result is due to the cross-coupled arrangement of the transistors 1 and 3 with respect to one another and also to the fact that the transistors are of opposite conductivity types. These currents are productive, therefore, of a combined voltage drop sufficient to drive the base electrode 9 further negative with respect to the emitter electrode 5 and give the transistor 1 an effective alpha greater than unity. The resistor 17 acts to further increase emitter current flow in transistor 1 to provide a well-known N-shaped characteristic curve for transistor 1 shown in FIG. 3 as the heavy solid curve.

In monostable circuits of the type wherein control of the emitter current is effected, the transition between the stable state and the unstable or saturated state of operation is controlled by varying the relative position of the operating load line with respect to the characteristic curve of the transistor device. The slope of the operating load line of the circuit is determined by the impedance of the emitter circuit and the voltage supplied to the emitter electrode of the transistor device so as to have a single intersection with the well-known N-shaped characteristic curve. The N-shaped characteristic curve shown in FIG. 3 is peculiar to transistor devices having a current amplification factor greater than unity and provided with a base resistor, e.g. resistor 17, which is sufficiently large to support regeneration. As shown in FIG. 3, the operating load line F intersects only the low current positive resistance region of the characteristic N-shaped curve at the point N, which is the equilibrium operating point of the circuit. Upon the application of a positive triggering pulse at input terminal 29, the reverse biasing effect of the voltage source 23 is overcome and a forward biasing voltage is developed across the back resistance of diode 35. This condition causes the operating point N to move up and around point H. As the triggering pulse applied to input terminal 29 drives the emitter voltage of transistor 1 more positive than the value at point H, the operating point is transferred along a constant voltage line to the high current positive resistance region and transistor 1 becomes rapidly saturated due to positive feedback. The transfer of the operating point to the high current positive resistance region is caused by the resulting increase of the emitter voltage due to the reverse biasing of the diode 35 by the triggering pulse.

After the triggering pulse terminates, the diode 35 becomes forward biased due to the emitter voltage of transistor 1 becoming more negative and capacitor 33 begins to charge through the forward resistance of diode 35 and the emitter-collector circuit of transistor 1. As capacitor 33 charges, the emitter voltage becomes more negative and the operating point moves downward along the high current positive resistance region of the characteristic curve toward the valley point J. The valley point is defined as the most negative excursion of the emitter voltage during a complete cycle of the monostable device. At the valley point J, the current limiting capacitor 33 is charged to a value sufficient to reverse bias the emitter electrode 5 with respect to the base electrode 9 and transfer the operating point of the equivalent transistor device to the low current positive resistance region along a constant voltage line to the point K. At this point of the operating cycle, the capacitor has accumulated a charge which must be dissipated before the circuit can be returned to its equilibrium operating point at N on the low current positive portion of the characteristic curve of FIG. 3. However, with the circuit as above described, the discharge time constant of the capacitor 33 is determined by the discharge path through the back resistance of diode 35 in series with the reverse impedance of the emitter-base junction of transistor 1 and resistor 17.

While the composite arrangement may be again transferred to a conductive state by a triggering pulse of equal magnitude across the back resistance of diode 35 even if the accumulated charge on the capacitor 33 has not been completely discharged, the output pulse duration supplied at output terminal 35 would be seriously affected. This results from the fact that the accumulated charge on capacitor 33 would operate as an additional voltage source to shorten the time required for the intersection of the emitter load line and the high current positive resistance portion of the emitter curve to reach the valley point J. The effect of such change would be to drop the intersection of the load line and the high current positive resistance region toward the valley point immediately on the termination of the triggering pulse.

It is evident that the monostable circuit so far described is operative if the current limiting capacitor 33 is connected directly to the emitter electrode 5. An attempted triggering of the circuit while a charge still remains on the directly connected capacitor 33 would not result in a decrease of output pulse duration as the capacitor would be discharged immediately and would subsequently begin to charge from this level to time the output pulse duration. However, triggering would require a pulse of sufficient magnitude to overcome the negative potential applied to the emitter electrode by the accumulated charge on the current limiting capacitor 33. The magnitude of this triggering pulse in such circumstances would decrease linearly as the accumulated charge upon the current limiting capacitor 33 discharges.

It is, therefore, evident that in a monostable circuit utilizing transistor devices having current amplification factors greater than one, the accumulated charge deleteriously affects the monostable operation of the circuit. In one instance, the effect is to shorten the output pulse duration as in the case where a diode is connected between the capacitor and the emitter electrode. In the second instance, the accumulated charge does not affect the output pulse duration but rather affects the magnitude of the input signal which is required to transfer the circuit from its stable operating condition to its unstable operating condition. According to the present invention, these effects are avoided by the employment of the transistor 37, shown in FIG. 1 as being associated with the monostable circuit which comprises the transistors 1 and 3. The transistor 37 has an emitter electrode 39, a collector electrode 41 and a base electrode 43. The transistor 37 is shown as an n-p-n junction transistor so as to be of an opposite conductivity type as transistor 1. The transistor 37 is employed to provide a rapid discharge for the current limiting capacitor 33 only during the interpulse interval. The emitter electrode 39 of transistor 37 is connected to the junction of the current limiting capacitor 33 and the anode of diode 35 so as to be effectively connected to the emitter electrode 5 of transistor 1. The base electrode 43 is connected to the junction of base electrode 9 of transistor 1 and collector electrode 13 of transistor 3 through the resistor 45. The resistor 45 is employed to insure that the impedance in the equivalent base circuit of the combined transistor device including transistors 1 and 3 is sufficiently large to support regeneration. As transistor 37 is biased to be normally conducting, the forward impedance of the collector-base circuit thereof in parallel with resistor 17 during application of a triggering pulse would effectively reduce the impedance in the equivalent base circuit of the composite arrangement if the resistor 45 were not arranged serially therewith. The collector electrode 41 is connected to ground through the resistor 47. The resistor 47 is employed to prevent an initial surge discharge current from the capacitor 33 from damaging the transistor 37. It is evident that the transistor 37 is arranged in the circuit with respect to the current limiting capacitor 33 so as to have its emitter-collector circuit in a parallel relationship therewith and with respect to the composite transistor arrangement so that the respective emitter-base circuits are in parallel.

During the stable state of operation of the composite device or arrangement, the transistors 1 and 3 are nonconductive. However, the transistor 37 is at this time in a conductive state. The negative voltage from source 23 is sufficient to forward bias the diode 35 and develop a voltage at the junction of the capacitor 33 and the emitter electrode 39 of transistor 37. Under these conditions, the emitter electrode 39 will be forward biased with respect to the base electrode 43, which is at essentially ground potential, and the transistor 37 conducts. A small voltage will therefore be developed across the capacitor 33 equal to the voltage drop across the emitter-collector circuit of transistor 37 in series with the resistor 47. Conduction in transistor 37 is effective to insure that the composite arrangement remains in a reverse biased condition. During conduction of transistor 37, the current flow therein develops a voltage drop across the resistor 45 in series with the emitter-base junction of transistor 37 and the forward resistance of diode 35. The voltage drop across the above-mentioned series circuit is applied across the emitter-base junction of transistor 1. The voltage is of such polarity to maintain transistor 1 in a reverse bias condition. Transistor 1 cannot become conductive while transistor 37 is conductive. Reliability of operation is achieved due to the conduction of transistor 37 during the stable operation of the composite arrangement. It is evident that transistor 1 upon being transferred to a saturated state of operation similarly prevents conduction in transistor 37. During this time, the potential on the base electrode 9 becomes sufficiently negative with respect to the emitter electrode 5 to insure that the transistor 37 remains reverse biased. Conduction in transistor 1 causes a base current to be injected in transistor 3 to initiate regeneration as has been above described. Conduction in transistors 1 and 3 results in the base electrode 9 becoming more negative with respect to the emitter electrode 5 to further decrease the emitter voltage on transistor 1. This will effectively forward bias the diode 35 and emitter current of transistor 1 flows through the current limiting capacitor 33. As the capacitor 33 charges, the potential on the base electrode 9 will similarly decline exponentially to a more negative potential. This decline in potential on the base electrode 9 operates to further reverse bias the emitter-base circuit of transistor 37. The current limiting capacitor 33 charges to a negative value which is sufficient to reverse bias diode 35 and stop conduction through the emitter circuit of transistor 1. At this portion of the operating cycle, a negative charge has been accumulated on the capacitor 33.

The transistor 37 is now in condition to be operated. The transistor 37 having been described as an n-p-n type junction transistor is effectively operated if the emitter electrode is negatively biased with respect to the base electrode. The capacitor 33 has acquired during the high current operation of the composite arrangement a negative charge which is applied to the emitter electrode 39 of transistor 37. During the charging of the capacitor 33, this negative charge was prevented from forward biasing the transistor 37 due to the fact that the potential applied to the base electrode 43 was determined by the more negative voltage developed across resistor 17 as a result of the regenerative operation of the composite arrangement. Regeneration across the resistor 17 was, therefore, not only effective to make the base electrode 9 more negative with respect to the emitter electrode 5 but also to make the base electrode 43 more negative with respect to the emitter electrode 39. Due to the fact that the respective emitter and base electrodes of transistors 1 and 37 are connected, the effect of the voltage drop across resistor 17 will be opposite with respect to each. In such an arrangement, it is only possible for one transistor to be conductive at the same time. Therefore, a reverse biasing of the transistor 1 by the current limiting capacitor 33 will result in the forward biasing of the transistor 37. The forward biasing of the transistor 37 is effective to provide a low impedance discharge path for the current limiting capacitor 33. This effectively by-passes the normally high impedance discharge path which would be provided through the back resistance of diode 35 in series with the reverse impedance of transistors 1 and base resistor 17.

In FIG. 4A is depicted a typical normal charging curve and discharging curve for capacitor 33. Upon the triggering of the composite arrangement, the capacitor 33 charges from point A to point B during the time interval $t_1-t_2$. At the point B which coincides with time $t_2$, a sufficient voltage charge V has accumulated on the capacitor 33 to reverse bias the emitter-base junction of transistor 1. The normal discharge curve for the capacitor 33 is depicted as the curve BD which occurs during the time interval $t_2-t_3$. A triggering of the composite arrangement during the time interval $t_2-t_3$ results in a variation of an output duration. It is, therefore, necessary that the capacitor 33 be allowed to discharge completely before a subsequent triggering of the circuit monostable so that the output pulse duration be maintained constant. The utilization of the transistor 37 to provide a low impedance discharge path for capacitor 33 results in the minimum interpulse interval of the composite circuit being reduced to that time which is required to discharge the capacitor 33 through the low impedance offered by the emitter-collector circuit of transistor 37 in series with resistor 47. The effect, therefore, of transistor 37 is to reduce the time required to discharge the capacitor 33 from the time interval $t_2-t_3$ to the time interval $t_2-t_4$. The resultant discharge curve of capacitor 33 through the transistor 37 is depicted as the dotted curve BE.

In FIG. 2, wherein like numerals denote corresponding elements as shown in FIG. 1, a composite transistor arrangement is employed in a monostable circuit wherein the unstable operation of the circuit is controlled by varying the composite alpha with time. The composite arrangement comprises transistors 1 and 3 which are cross coupled in a manner described above with reference to FIG. 1. The application of a triggering pulse at input terminal 29 is applied through the coupling capacitor 31 effectively to forward bias the emitter electrode 5 with respect to the base electrode 9 and initiate conduction in transistor 1. However, the operation of this circuit is distinguishable from the circuit shown in FIG. 1 in that the effective alpha is initially very high upon triggering but decreases with time to a point whereat regeneration cannot be maintained. To follow through the operation of this circuit, consider that the collector current of transistor 1 is directed to a parallel arrangement which includes in one leg resistor 19 and in the other leg the emitter-base circuit of transistor 3 in series with resistor 19. The current limiting capacitor 33 is connected in parallel with the resistance 21. Collector current from transistor 1 is directed to the base electrode 15 and is sufficient to drive transistor 3 to conduction. Initially, the capacitor 33 appears as an effective short to the emitter current of transistor 3 so that the collector current from transistor 1 is directed primarily through the leg which includes the emitter-base circuit of transistor 3. The result of the collector current of transistor 3 flowing through the base resistor 17 is effective to initiate regeneration. This circuit would be self-sustaining but for the effect of the current limiting capacitor 33. The emitter current from transistor 3 will flow through the capacitor 33 which charges exponentially to increase the impedance offered to current flow by the emitter-base junction of transistor 3. As the capacitor 33 charges, less current will be injected into the base of transistor 3 and more will be directed through the resistor 19. This results due to the fact that the ratio of the effective impedance offered to the collector current of transistor 1 in each of the parallel legs varies. A decrease of conduction in transistor 3 results in a decrease of the positive feedback current through the base resistor 17.

A better understanding of the operation of the circuit of FIG. 2 may be had if reference is taken to the curves depicted in FIGS. 3, 4A and 4B. The curve of FIG. 3 shows the effect upon the negative input resistance characteristics of the composite arrangement due to the variation of the effective alpha with time by the current limiting capacitor 33. The operating load line of the circuit of FIG. 2 is shown as line L. The effective composite alpha is varied due to the reduced collector current of transistor 3 flowing through the base resistor 17. At the time $t_1$, a triggering pulse is applied to input terminal 29 to initiate conduction in the composite arrangement and charge capacitor 33 exponentially along the portion of the curve AB as shown in FIG. 4A. Due to the negligible impedance offered by the capacitor 33 to current flow, practically all of the collector current of transistor 1 is directed to the base of transistor 3 and amplified. The effect of the collector current of transistor 3 on the base resistor 17 is greatest at this time. The result of the collector current of transistor 3 is to drive the effective alpha of the composite arrangement to its maximum point. This is depicted in FIG. 4B which shows an almost vertical rise for the value of alpha at the time $t_1$. This maximum alpha is also determinative of the valley point or maximum negative excursion of the emitter voltage. This maximum negative excursion is denoted in FIG. 3 as the point J. As the capacitor 33 charges, the value of the alpha of the composite arrangement decreases in a substantially linear manner as less current is flowing through the base resistor 17 due to the operation of the transistor 3. This decrease in current flow through the resistor 17 effectively reduces the amount of regeneration in the circuit. Accordingly, the valley point J of the negative resistance input characteristics of the composite arrangement moves upward and the maximum negative excursion of the emitter voltage is limited to a less negative value. As the slope of the high current positive resistance portion of the characteristic curve is essentially determined by the base resistor in parallel with the collector resistance, this portion of the curve remains fixed. The slope of the negative resistance portion of the curve HJ, however, is determined by the base resistance multiplied by the factor (1-alpha). Therefore, a diminution of the collector current of resistor 3 through the base resistor 17 due to the charging of capacitor 33 results in a decrease of the composite alpha to affect a greater slope for the negative resistance portion of the characteristic curve. This results in the travel of the valley point J in the direction of the arrows along the high current positive resistance region of the characteristic curve to the point I. As the capacitor 33 charges between the points A and B, the effective alpha will decrease to a point at time $t_2$ when the load line L no longer intersects the high current positive resistance region of the characteristic curve. During the decrease of the composite alpha, the valley point is traveling along the high current positive resistance portion of the characteristic curve toward the point I. The load line L is not relocated on the characteristic curve by the operation of this circuit as it is when the emitter current is limited as described above with reference to the circuit of FIG. 1. Its slope remains constant due to a dependency upon the nonvarying resistor 35. At a time $t_2$, the valley point reaches the point M and the load line L no longer intersects the high current positive portion of the characteristic curve. The only point of operation for the circuit is now at N which is the intersection of the load line with the low current positive portion of the characteristic curve. A transfer of the operating point of the composite arrangement to the point N results since regeneration cannot be maintained for the composite arrangement. The emitter-base junction of the transistor 1 now becomes reverse biased and conduction in the composite arrangement ceases.

Upon the operating point of the circuit transferring to the point N at the time $t_2$, the capacitor 33 is charged to a voltage V at the point B in FIG. 4A. In order for the monostable circuit of FIG. 2 to return to its normal state, it is necessary that the capacitor 33 be discharged. A triggering of the monostable circuit at this time affects a decrease in the duration of the output pulse and would require a triggering pulse of sufficient magnitude to initiate sufficient positive feedback to support regeneration. For example, if the monostable circuit were to be triggered while the capacitor 33 has an accumulated charge equal to $V_1$ shown at point D in FIG. 4A, the output pulse duration would be determined by the time required for the capacitor 33 to charge from the voltage $V_1$ to the voltage V or along that portion of the curve CB. The output pulse duration would be equal to the time $t_5-t_2$ and be shortened by the time $t_1-t_5$. The initial composite alpha under these conditions is also decreased as the emitter-base junction of transistor 3 would present a greater impedance to the collector current of transistor 1. Accordingly, less collector current of transistor 3 is directed through the resistor 17 and the negative resistance effect thereof is reduced. The decrease of the effective alpha results in the valley point being initially at the point O on the high current positive region of the characteristic curve. Therefore, the output pulse duration is determined by the time required for the valley point of the characteristic curve to travel from the point O to the point M so that the high current positive portion of the characteristic curve does not intersect the load line L.

To rapidly discharge the capacitor 33, the transistor 37 is associated with the composite arrangement. The transistor 37 has the conventional three electrodes as were described with respect to FIG. 1 and is of the opposite conductivity type as transistor 3. The emitter and base electrodes of transistors 1 and 37, respectively, are electrically integral. The collector electrode 41 is connected through the resistor 47 to the junction of the resistors 19 and 21. During the operation of the composite arrangement, the conduction of the transistor 3 is sufficient to apply a reverse biasing potential across the emitter-base junction of transistor 37. While the capacitor 33 is charging or during that time in which the transistor 3 is conducting, the transistor 37 has a negligible effect upon the operation of the circuit. Upon the capacitor 33 having charged sufficiently to reverse bias the transistor 3 and block regeneration, a more positive potential is applied to the emitter electrode 39 thereby. The potential on the base electrode 43, due to the nonconduction of transistor 1, becomes more negative, being approximately equal to the voltage source 23 less the drop through the resistor 19. The application of these potentials to the emitter electrode 39 and the base electrode 43 provides a forward biasing condition for the transistor 37. The conduction of transistor 37 completes a path through the emitter-collector circuit therein and the resistor 47 in shunt with the capacitor 33. Resistor 47 is similarly utilized to prevent a surge current from the capacitor 33 from damaging the transistor 37.

Considering for the moment the discharge path of capacitor 33 without the employment of the transistor 37, the discharge time constant of capacitor 33 would be determined by the back impedance of the emitter-base junction of transistor 3 in series with the resistor 19. As the emitter-collector circuit of transistor 37 is in parallel with the capacitor 33, the low impedance offered by it determines and reduces the time required to discharge capacitor 33.

The effect of transistor 37 on the circuit operation is graphically demonstrated in FIG. 4A, in the same manner as described above with respect to FIG. 1. However, a distinction may be made between the employment of the discharge transistor 37 in the circuits depicted in FIGS. 1 and 2. In the circuit of FIG. 1, it was stated that the transistor 37 is normally conducting prior to and during the application of a triggering pulse. Such conduction is not objectionable in that it maintains the composite arrangement in a non-conductive state. However, in the arrangement of FIG. 2, the transistor 37 as well as the transistors 1 and 3 is normally nonconducting. It is evident from the circuit arrangement of FIG. 2 that the base and emitter electrodes of transistor 37 are maintained in a reverse biased condition by the leakage current through transistor 3.

It is to be understood that the above-described arrangements are illustrative of the application of the principles of the invention. Numerous other arrangements may be devised by those skilled in the art without departing from the spirit and scope of the invention.

What is claimed is:

1. A monostable transistor circuit having a stable and an unstable state of operation comprising a first transistor device having an emitter, base and collector electrode, a common junction point, current limiting capacitor means connected between said emitter electrode and said common junction point and operative to determine the duration of said unstable state of operation, a feedback promoting impedance element connected between said base electrode and said common junction point, and a second transistor device of opposite conductivity type having an emitter-base circuit and an emitter-collector circuit, said emitter-base circuit being connected between said emitter and said base electrodes of said first transistor device, said emitter-collector circuit being connected between said emitter electrode of said first transistor and said common junction point, and biasing means connected to said emitter and said collector electrodes of said first transistor device for normally maintaining said first transistor device nonconductive.

2. In a monostable circuit having a first and a second state of operation, a first transistor device and a second transistor device of opposite conductivity type, each of said first and second transistor devices having a base emitter, and collector electrode, means connecting said base electrodes of said first and said second transistor devices, means connecting said emitter electrodes of said first and said second transistor devices, biasing means connected to said emitter and said collector electrodes of said first transistor device, a feedback promoting impedance connected to said base electrodes of said first and said second transistor devices and providing with said first transistor device for said first and said second states of operation, and current limiting capacitor means connected between said emitter and said collector electrodes of said second transistor device and operative to control the duration of operation of said first transistor device whereby said first state of operation of said monostable circuit is determined, said second transistor device being operative to provide a low impedance discharge path for said capacitor means during said second state of operation.

3. A high duty cycle monostable trigger circuit comprising a three-terminal combined transistor device having a first, a second, and a third junction transistor interconnected to provide for current multiplication and rapid restoration, each of said first, said second, and said third transistors including an emitter, a base, and a collector, said bases of each of said first and said second transistors being electrically integral with said collectors of the other of said first and said second transistors, said emitters of said second and said third transistors being electrically integral, said bases of said second and said third transistors being electrically integral, biasing means connected to said emitter of said first transistor which emitter forms a first terminal of said three-terminal device, and a feedback promoting impedance element connected to said base of said first transistor which base forms a second terminal of said three-terminal device, said three-terminal device including a capacitive device connected to said emitters of said second and said third transistors, and means including a third terminal for said three-terminal device connecting said collector of said third transistor to said capacitive device.

4. A monostable circuit including a first transistor device having a collector, base, and emitter electrode, load means connected to said collector electrode, an impedance means connected to said base electrode and providing with said transistor device for a stable and an unstable state of operation, an input terminal connected to said emitter electrode for supplying pulses effective to transfer said monostable circuit from said stable to said unstable state of operation, a current limiting capacitor connected to said emitter electrode for controlling the duration of said unstable state of operation, and a second transistor device of opposite conductivity type having an emitter-collector circuit and a base electrode, said base electrode of said first transistor device being connected to said base electrode of said second transistor device and said emitter-collector circuit of said second transistor device being arranged in a shunt relationship to said current limiting capacitor.

5. A monostable circuit comprising a first transistor device and a second transistor device of opposite conductivity type, each of said transistor devices having an emitter, base, and collector electrode, said base electrodes of said first and said second devices being electrically connected, means for supplying operational potentials to said collector and said emitter electrodes of said first transistor device, impedance means connected to said base electrodes of said first and said second devices and providing with said first transistor device for a stable and an unstable state of operation, a current limiting capacitor connected across said emitter and said collector electrodes of said second transistor device and operative to control the duration of said unstable state of operation of said monostable circuit, a unilateral conducting device connected between said emitter electrodes of said first and said second transistor devices and poled in a direction of positive emitter current through said first transistor device, and means including said second transistor device for providing a low impedance discharge path for said current limiting capacitor when said monostable circuit returns to said stable state of operation.

6. An electrical trigger circuit including a junction transistor having an emitter, base, and collector electrode, a point of fixed reference potential, impedance means connected between said base electrode and said point of fixed potential, an external network interconnecting said collector and base electrodes to regeneratively feed back current and providing with said impedance means and said transistor for a stable and an unstable state of operation, load means including a potential source connected between said point of fixed potential and said collector electrode, current limiting capacitor means connected between said emitter electrode and said point of fixed reference potential for determining the duration of said unstable state of operation, and variable resistance means connecting said emitter electrode to said point of fixed potential and responsive to said transistor during said stable state of operation to present an impedance to current flow from said current limiting capacitor means whose magnitude is smaller than either the reverse impedance between said emitter electrode and said base electrode of said transistor or said impedance means, said variable resistance means being operative to present an impedance to emitter current flow whose magnitude is greater than the sum of the forward impedance between said emitter electrode and said base electrode and said impedance means during said unstable state of operation.

7. An electrical trigger circuit including a junction transistor having an emitter, base, and collector electrode, means providing a point of fixed potential, impedance means connected between said base electrode and said point of fixed potential, an external network interconnecting said collector and said base electrodes to regeneratively feed back current and providing with said impedance means and said first transistor for a stable and an unstable state of operation, load means including an operational potential source connected between said point of fixed potential and said collector electrode, a current limiting capacitor connected between said point of fixed potential and said emitter electrode for determining the duration of said unstable state of operation, and a variable impedance current path connecting the junction of said current limiting capacitor and said emitter electrode to said point of fixed potential, said current path comprising a second transistor of opposite conductivity type having an emitter-collector circuit contained in said current path and having a base electrode connected to said base electrode of said first transistor and so arranged as to be conductive during said stable state of operation of said trigger circuit.

8. A monostable circuit comprising an equivalent current multiplication device including a first and a second transistor of opposite conductivity type, each of said transistors having a base, collector, and emitter, said base of each of said transistors being electrically integral with the said collector of the other of said transistors, a feedback promoting impedance connected to said base of said first transistor and providing with said equivalent device for a stable and an unstable state of operation, input terminal means connected to said emitter electrode of said first transistor for receiving triggering pulses to transfer said monostable circuit from said stable to said unstable state of operation, a common junction point, a capacitive device connecting said emitter electrode of said second transistor to said common point, means connecting said base electrode of said second transistor to said common point, biasing means connected to said emitter electrode of said first transistor to maintain said first and second transistors in a normally reverse biased state, and transistor means responsive to the voltage developed across said capacitor during said unstable state of operation to provide a low impedance current path from said emitter electrode of said second transistor to said common point.

9. A trigger circuit comprising a combined transistor device, said device including a first and a second transistor of opposite conductivity type, each of said first and said second transistors having a base, emitter, and collector electrode, said base electrode of each of said transistors being electrically integral with said collector electrode of the other of said transistors, a resistance element connected to said base electrode of said first transistor, biasing means connected to said emitter electrode of said first transistor, a series arrangement including a first and a second impedance element connected between said base and said emitter electrodes of said second transistor, load means including a voltage source connected to the junction of said first and said second impedance elements, capacitive means connecting said emitter electrode of said second transistor to the junction of said first and said second impedance elements, said capacitive means being operable to determine the duration of the operation of said combined device, and transistor means connecting the junction of said first and said second impedance elements to the junction of said emitter electrode of said second transistor and said capacitive means and controlled by the condition of said second transistor to provide a current discharge path for said capacitive means.

10. In a high duty cycle monostable trigger circuit having a stable and an unstable state of operation, an equivalent current multiplication transistor comprising a first p-n-p transistor and an n-p-n transistor, each of said first p-n-p and said n-p-n transistors having an emitter, base, and collector electrode, said base electrode of each of said transistors being electrically integral with said collector electrode of the other of said transistors, biasing means connected to said emitter electrode of said first p-n-p transistor, a capacitive timing device associated with said equivalent transistor and operative to control the duration of said unstable state of operation, and a second p-n-p transistor having an emitter-base circuit connected between said emitter and said base electrodes of said n-p-n transistor, and an emitter-collector circuit arranged in parallel with said capacitive device, said second p-n-p transistor being responsive to said capacitive device and said equivalent transistor upon having assumed said stable state of operation to provide a current discharge path for said capacitive device through said emitter-collector circuit.

11. In a transistor circuit comprising a first and second transistor device of opposite conductivity types each having emitter, base and collector electrodes, said emitter electrodes of said first and second transistor devices being electrically integral, said base electrodes of said first and second transistor devices being electrically integral, impedance means connected to said electrically integral base electrodes, a first impedance device connected to said collector electrode of said first transistor device, a second impedance device connected to said collector electrode of said second transistor device, biasing means connected to said electrically integral emitter electrodes for normally maintaining said first transistor device in a forward-biased condition and said second transistor in a reverse-biased condition, and input means connected to said electrically integral emitter electrodes to direct triggering pulses for forward-biasing said second transistor device and reverse-biasing said first transistor device.

12. A monostable transistor circuit having a stable and an unstable state of operation comprising a pair of opposite conductivity transistors having their collectors and bases directly cross-connected, feedback impedance means connected to said pair of transistors and providing with said pair of transistors for said stable and unstable states of operation, a timing capacitor connected to the emitter of one of said transistors, a third transistor of opposite conductivity type to said one transistor and having its emitter connected to said one transistor emitter, the emitter-base circuit of said third transistor being connected in shunt with said emitter-base circuit of said one transistor so that only one of said third transistor and said one transistor can be conducting at a time and the emitter-collector circuit of said third transistor being connected in shunt with said timing capacitor, and biasing means connected to said one transistor emitter and said third transistor emitter.

References Cited in the file of this patent

UNITED STATES PATENTS

| | | |
|---|---|---|
| Re.24,303 | Wood | Apr. 16, 1957 |
| 2,663,800 | Herzog | Dec. 22, 1953 |
| 2,827,568 | Altschul | Mar. 18, 1958 |
| 2,829,257 | Root | Apr. 1, 1958 |
| 2,843,743 | Hamilton | July 15, 1958 |
| 2,864,961 | Lohman et al. | Dec. 16, 1958 |
| 2,880,332 | Wanlass | Mar. 31, 1959 |